J. T. WATTERS.
VEHICLE HUB.
APPLICATION FILED APR. 8, 1908.

928,413.

Patented July 20, 1909.

Witnesses
R. A. White
Harry R. L. White

Inventor
John J. Watters
By Jno. G. Elliott
Atty.

UNITED STATES PATENT OFFICE.

JOHN THOMAS WATTERS, OF CHICAGO, ILLINOIS.

VEHICLE-HUB.

No. 928,413.

Specification of Letters Patent.

Patented July 20, 1909.

Application filed April 8, 1908. Serial No. 425,817.

*To all whom it may concern:*

Be it known that I, JOHN T. WATTERS, citizen of the United States, and resident of Chicago, in the county of Cook and State of Illinois, have invented certain new and useful Improvements in Vehicle-Hubs, of which the following is a full, clear, and exact specification.

This invention relates to improvements in vehicle hubs in which the spokes of a wheel are composed of wires or tubing bent to form two integral spokes connected by means of clips with hubs cut from lengths of tubing.
In the constructions prior to my invention the clips have been soldered, brazed or welded directly to the hub tube and bent to the form of eyes encircling the bend joining the spokes in pairs and depending entirely upon the stiffness of the metal from which the clips are formed to prevent the clips from straightening out and releasing the spokes therefrom, as frequently happens to the injury and sometimes the destruction of the wheel.

The formation of hubs by cutting from lengths of tubing in short pieces is undesirably expensive and added to by the cost of soldering, brazing or welding the clips for the spokes thereto, and this together with the instability of the wheel due to the lack of rigidity and permanency in the clips after being bent upon the spokes is very desirable to avoid.
The prime object of my invention is to provide such a construction connecting the hub with the spokes that there is no possibility of eyes being straightened at all by the strain of the spokes when the clips are once bent to their operative position thereon, and at the same time avoid any necessity for soldering, brazing or welding the clips to the hub.

A further object of my invention is to avoid the necessity of employing sections of seamless tubing for forming the hub, and to successfully use short pieces of metal bent upon themselves for hubs.

A still further object of my invention is to have the clip structure so formed that it may surround and be secured to the hub, and at the same time serve to hold in place devices for locking the clips against straightening when once bent to form and locked in their operative position.

With these ends in view, my invention consists in certain features of novelty in the construction, combination and arrangement of parts, by which the said objects and certain other objects hereinafter appearing are attained, all as fully described with reference to the accompanying drawings, and more particularly pointed out in the claims.

Figure 1:
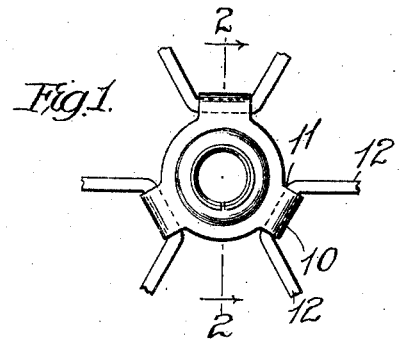
Figure 2:
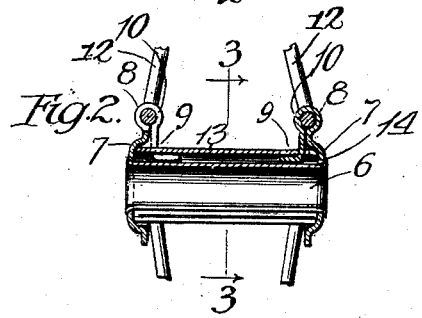
Figure 3:
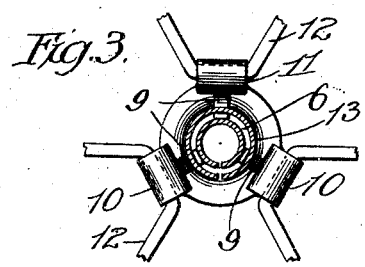
Figure 4:
Figure 5:
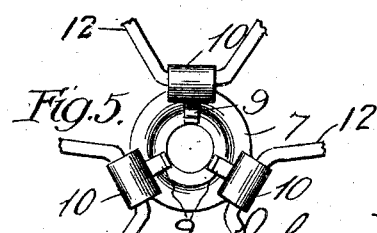

In said drawings: Figure 1 illustrates a detailed end elevation of a wheel having a hub embodying my invention; Fig. 2 is a longitudinal section thereof taken on the line 2—2, Fig. 1; Fig. 3 is a transverse section taken on the line 3—3, of Fig. 2; Fig. 4 is a side elevation of a tubular locking device for the clips; and Fig. 5 is a detailed end elevation of the clip structure.

Similar characters of reference indicate the same parts in the several figures of the drawings.

6 indicates the metal bearing part of the hub, which consists of a piece of metal bent to tubular form with the opposing meeting edges unsecured together. Upon the outer ends of the bearing piece 6 is secured a clip plate 7, having formed integral therewith clips 8 narrowed to form tongues 9 at their free ends, and of a metal capable of being bent to form eyes 10 inclosing a bend 11, joining twin spokes 12—12 of wire or small tubing, the free ends of which may be secured to the rim of the wheel (not shown) in the usual and ordinary manner.

The length of clips and their tongues is such that after bending a clip upon itself to form a closed eye about the bend in the spoke, the tongues, by a reverse bending, may be projected laterally inwardly beyond the clips, so as to project between the hub and a tubular locking device 13 surrounding the hub, and likewise bent to tubular form with its edges left unjoined.

The tubular locking device 13 is provided at its opposite ends with slots 14—14 in register with the tongues 9 of the clips at each end, and through which the tongues are passed and projected between the body of the tubular device and the metal bearing, as shown in Fig. 2, the several parts being locked in the manner above described by expanding the ends of the hub 6 in the clip plate 7, and in such a manner that together with this expansion and the pressure of the clip plate against the ends of the tubular locking device 13, they are all firmly locked against any independent movement with relation to each other and with the spokes.

The slots 14—14 are preferably out of line with each other, as indicated in Fig. 4, in order that the spokes at the opposite sides of the wheel may be in alternating arrangement and their tension, therefore, distributed more uniformly throughout the wheel structure.

In assembling the hub and securing the spokes in their operative position the clips are from a straight condition, first bent over the bend connecting the pairs of spokes until the eye therein is formed, and the clip tongues being then passed through the slots of, and bent inwardly against the underside of the tubular locking device, after which the tubular hub is passed through the clip plates, and its ends expanded in the clip plates, as shown in Fig. 2, in such a manner that the clip plates are pressed tightly against the ends of and tightly clamp the tubular locking device between them.

My invention is not limited to the particular form of clip and clip plate shown and described, for any form or forms would be within my invention so long as the plates provide for expanding the hub therein, and the clips adapted to be bent around the ends of the spokes with the free ends of the clips projected and held between the hub and the surrounding structure and this whether the hub is cut from a length of tubing or formed by bending a piece of metal to tubular form without joining the adjacent edges thereof, although in practice I prefer to use a tubular locking device clamping it between them and held against accidental detachment by expanding the tubular hub piece therein.

In conclusion, it should be observed that by forming the clips upon a plate encircling the hub the plate performs the further function of preventing the hub piece from separating, and therefore, enables it to perform its functions, and have the same degree of rigidity as though made from a section of seamless tubing.

Now having described my invention what I claim and desire to secure by Letters Patent is:—

1. A vehicle hub comprising in combination a tubular bearing piece, clips secured adjacent to each end thereof and bent to form eyes for surrounding a bend in the spokes of a wheel, and a surrounding structure provided with slots through which the ends of said clips project, substantially as described.

2. A vehicle hub comprising in combination a tubular bearing piece, clip structures toward opposite ends thereof provided with clips bent to form eyes for holding the spokes of a wheel and with their free ends bent to a plane parallel with the length of the hub, substantially as described.

3. A vehicle hub comprising in combination a tubular bearing piece, a clip structure mounted thereon provided with clips bent to form eyes receiving the spokes of the wheel, and their free ends in a line parallel with the length of hub, and means surrounding the outer faces of said ends between which and the hub the said free ends are confined, substantially as described.

4. A vehicle hub comprising in combination a tubular bearing piece, a tubular locking device surrounding said piece, a clip structure at opposite ends thereof provided with clips bent to form eyes for receiving the spokes of the wheel, with their free ends projected inwardly between the hub piece and the locking device, substantially as described.

5. A vehicle hub comprising in combination a tubular bearing piece, clip plates secured at opposite ends thereof and provided with clips bent to the form of eyes surrounding the spokes of a wheel with their free ends projected in a plane substantially parallel with the hub, and a bent tubular locking device surrounding the ends of the clips, substantially as described.

6. A vehicle hub comprising in combination a tubular hub bearing, a tubular locking device surrounding said bearing and provided with end slots, clip plates secured to the bearing piece and bent so as to surround the spokes and project through said slots and between the bearing piece of the hub and the surrounding tubular locking device, substantially as described.

7. A vehicle hub comprising in combination a hub bearing of metal plate bent to tubular form with its opposite meeting edges detached from each other, clip plates secured at opposite ends of said tubular bearing and having clips forming eyes with their free ends projecting laterally therefrom and a locking device between which and the bearing the free ends of the clips are confined, such locking device being bent from a piece of metal to the form of a tube the opposing edges of which are disconnected, substantially as described.

8. A vehicle hub comprising in combination a tubular hub bearing piece, clip plates in which the ends of the tubes are expanded, such clip plates being provided with clips bent to form eyes and terminating at their free ends in tongues, and a tubular locking device surrounding and confining said device between it and the bearing piece of the hub, substantially as described.

In witness whereof, I have hereunto set my hand and affixed my seal, this thirty-first day of March A. D. 1908.

JOHN THOMAS WATTERS. [L. S.]

Witnesses:
JNO. G. ELLIOTT,
M. G. FITZSIMMONS.